(12) United States Patent
Takada et al.

(10) Patent No.: US 10,901,288 B2
(45) Date of Patent: Jan. 26, 2021

(54) DISPLAY DEVICE AND DRIVING METHOD

(71) Applicant: TOPPAN PRINTING CO., LTD., Taito-ku (JP)

(72) Inventors: Takehisa Takada, Taito-ku (JP); Mamoru Ishizaki, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 0 days.

(21) Appl. No.: 16/504,019

(22) Filed: Jul. 5, 2019

(65) Prior Publication Data
US 2019/0331979 A1    Oct. 31, 2019

Related U.S. Application Data

(63) Continuation of application No. PCT/JP2017/043728, filed on Dec. 6, 2017.

(30) Foreign Application Priority Data
Jan. 6, 2017 (JP) .................. 2017-001141

(51) Int. Cl.
*G02F 1/1685* (2019.01)
*G02F 1/16761* (2019.01)
(Continued)

(52) U.S. Cl.
CPC ............ *G02F 1/1685* (2019.01); *G02F 1/167* (2013.01); *G02F 1/16761* (2019.01);
(Continued)

(58) Field of Classification Search
CPC .. G02F 1/167; G02F 1/16761; G02F 1/16766; G09G 3/344
(Continued)

(56) References Cited

U.S. PATENT DOCUMENTS 7,046,228 B2* 5/2006 Liang ............... G02F 1/167
345/107
2012/0008188 A1* 1/2012 Telfer ............... G02F 1/167
359/296
(Continued)

FOREIGN PATENT DOCUMENTS

JP  2015-532461  11/2015
JP  2016-537687  12/2016

OTHER PUBLICATIONS

International Search Report dated Feb. 27, 2018 in PCT/JP2017/043728, filed Dec. 6, 2017, (with English Translation).

*Primary Examiner* — Calvin C Ma
(74) *Attorney, Agent, or Firm* — Oblon, McClelland, Maier & Neustadt, L.L.P.

(57) ABSTRACT

A display device including a pair of substrates having surfaces facing each other and electrodes formed on the surfaces, respectively, a display medium having a memory effect and formed between the pair of substrates, and a drive unit that applies a drive voltage to the display medium. The display medium includes charged particles encapsulated therein such that movement of the charged particles based on a voltage applied by the drive unit provides display, and the charged particles include first particles for displaying a first color with application of a first voltage, second particles for displaying a second color with application of a second voltage having a polarity different from a polarity of the first voltage, and third particles for displaying a third color with application of a third voltage which has the same polarity as the polarity of the first voltage and an absolute value smaller than an absolute value of the first voltage.

20 Claims, 13 Drawing Sheets

(51) Int. Cl.
*G02F 1/16766* (2019.01)
*G02F 1/167* (2019.01)
*G09G 3/34* (2006.01)
*G02F 1/1675* (2019.01)

(52) U.S. Cl.
CPC ......... *G02F 1/16766* (2019.01); *G09G 3/344* (2013.01); *G02F 2001/1678* (2013.01); *G09G 2310/068* (2013.01)

(58) Field of Classification Search
USPC .................................. 345/107, 690; 349/41
See application file for complete search history.

(56) References Cited

U.S. PATENT DOCUMENTS

| | | | |
|---|---|---|---|
| 2013/0033531 A1* | 2/2013 | Kim | G09G 3/2003 345/691 |
| 2013/0070174 A1* | 3/2013 | Yoshida | G09G 3/20 349/41 |
| 2015/0097877 A1* | 4/2015 | Lin | G09G 3/344 345/691 |
| 2018/0031941 A1* | 2/2018 | Goulding | G02F 1/167 |

\* cited by examiner

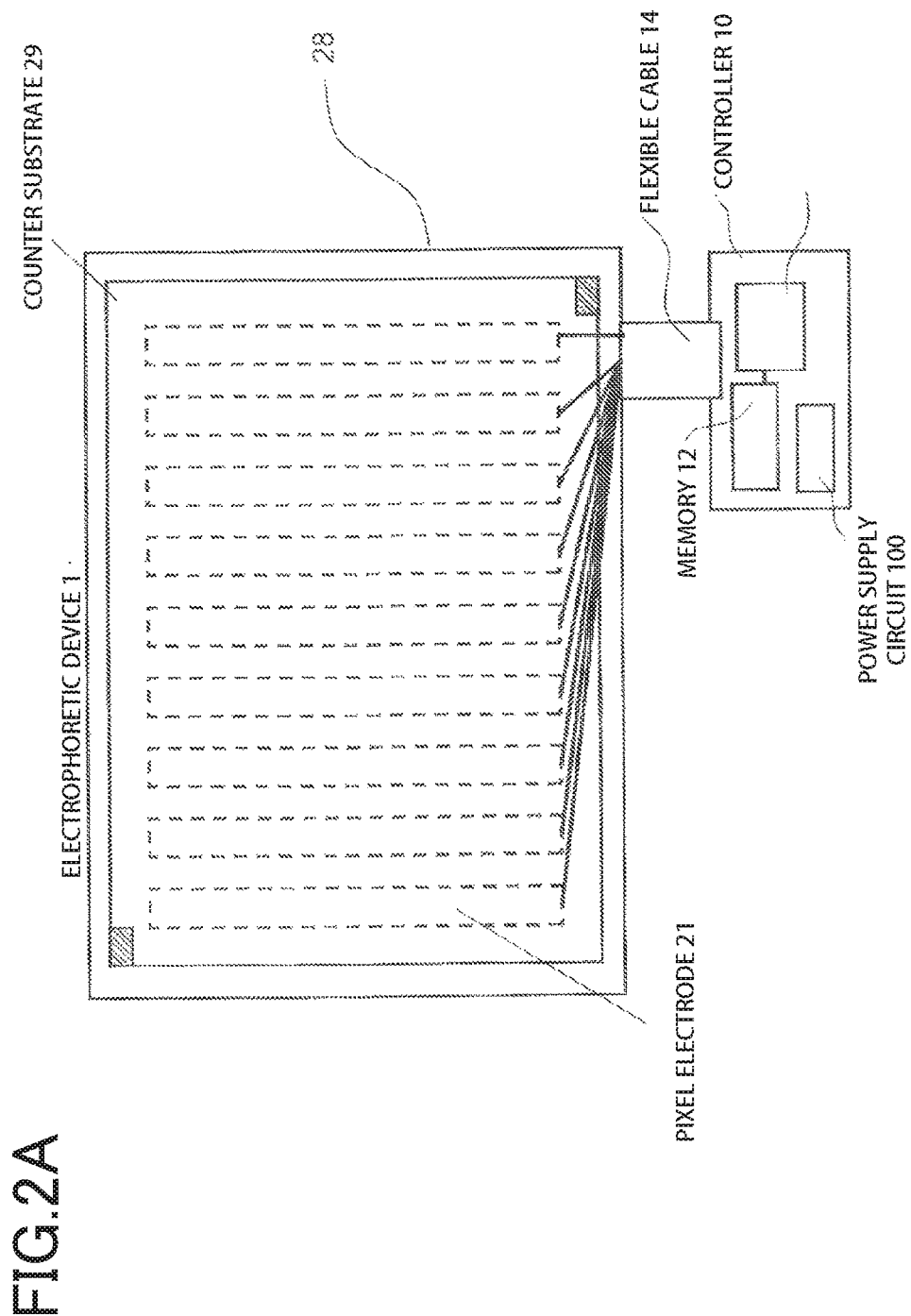

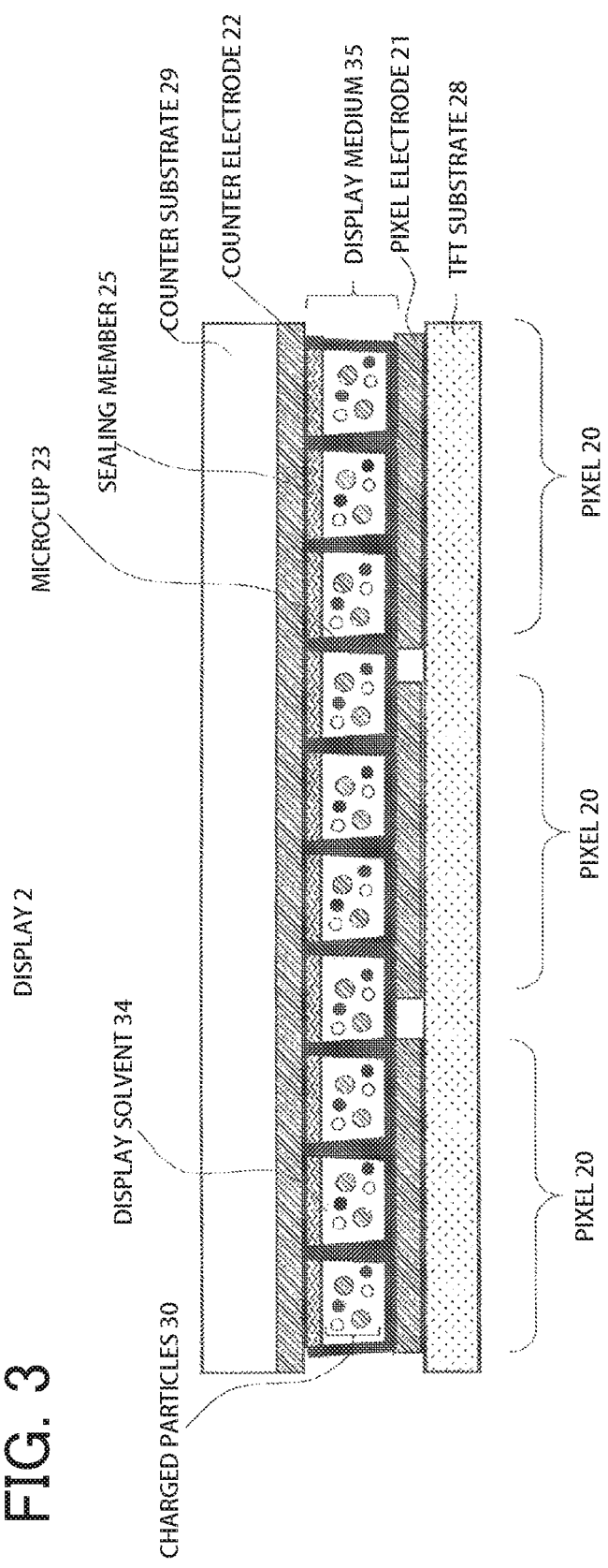

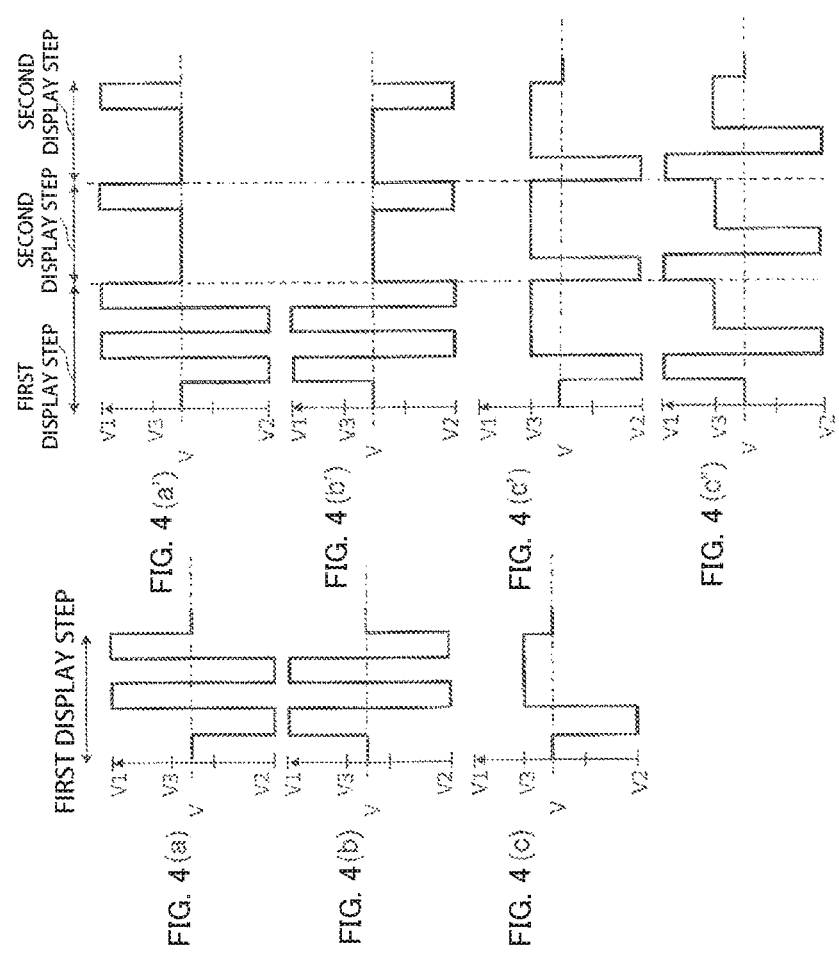

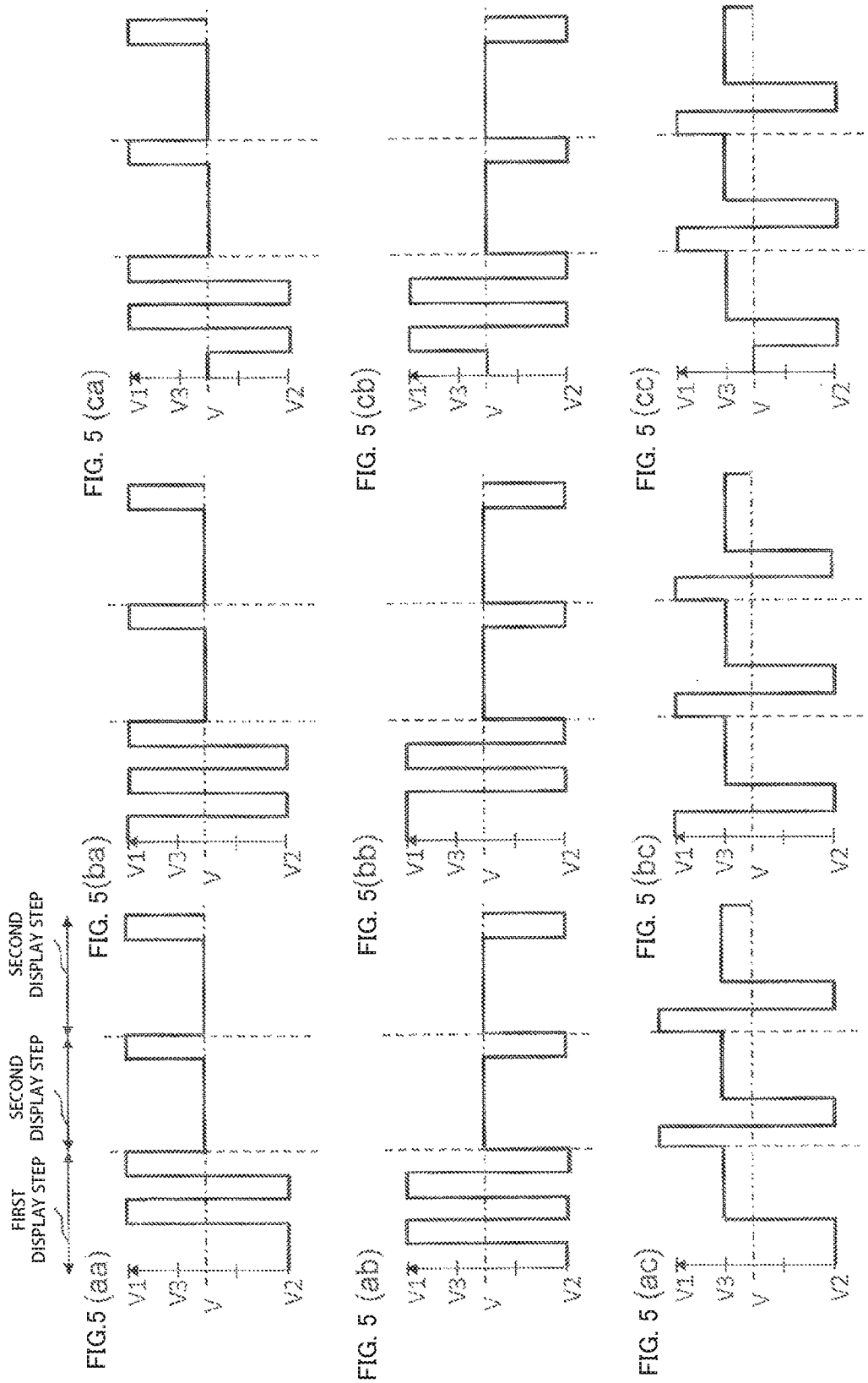

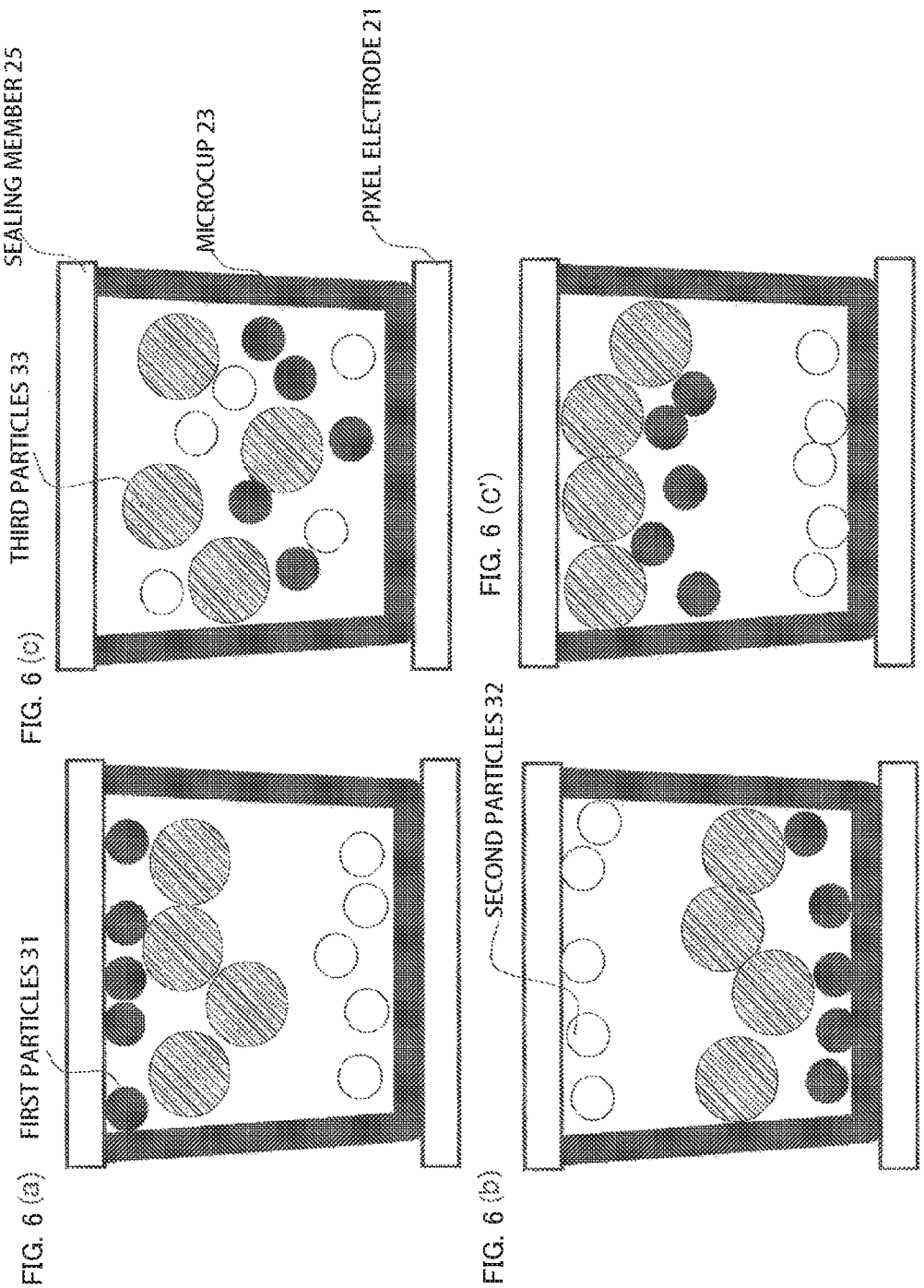

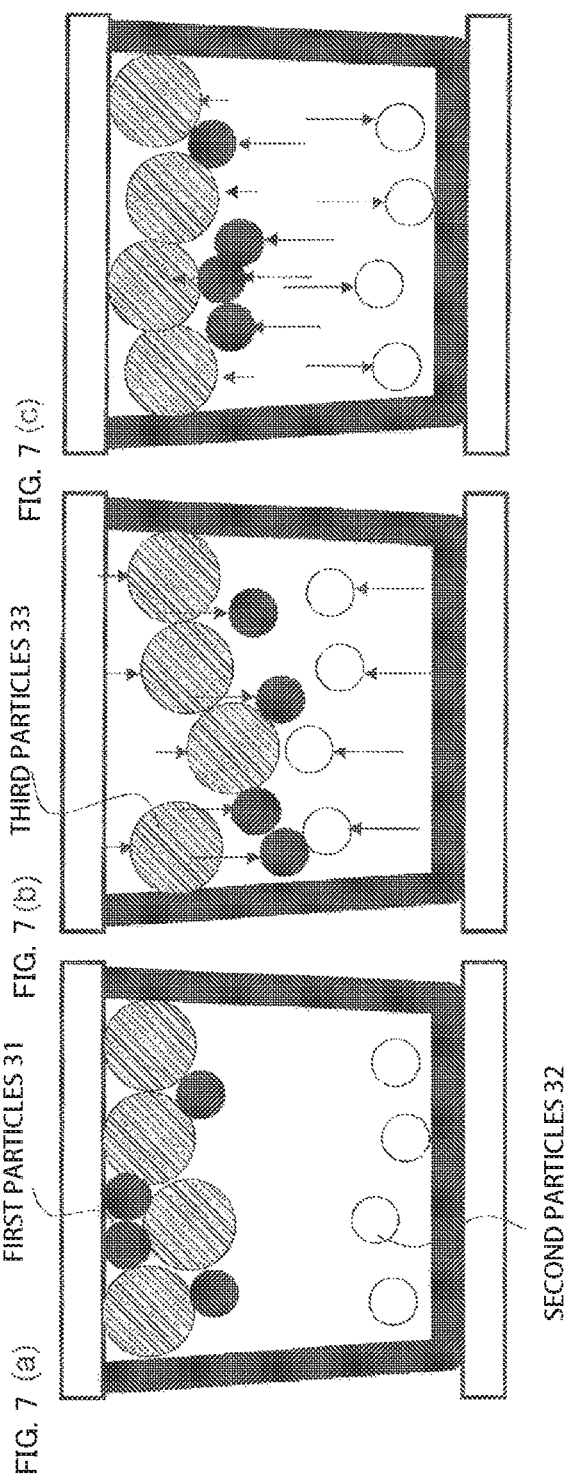

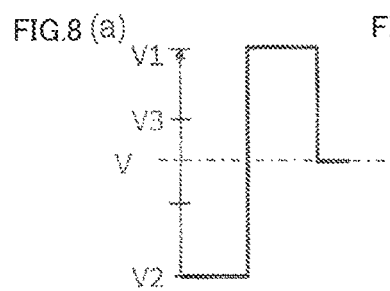
FIG.8 (a)
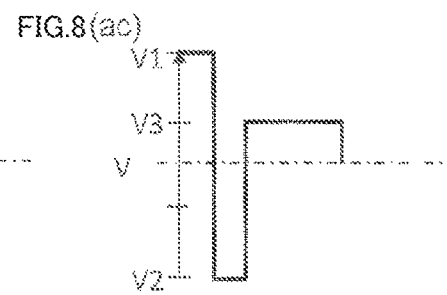
FIG.8 (ac)
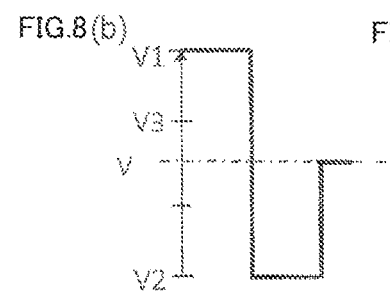
FIG.8 (b)
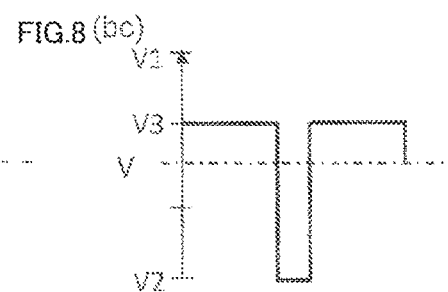
FIG.8 (bc)
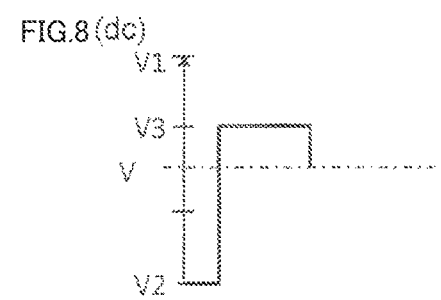
FIG.8 (dc)

FIG.9(a)
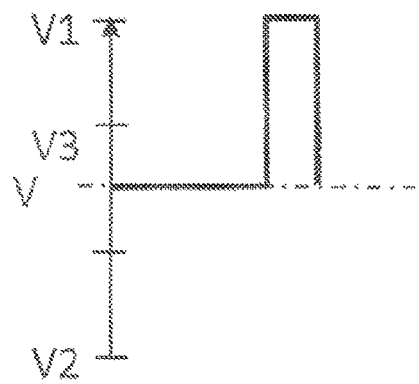
FIG.9(b)
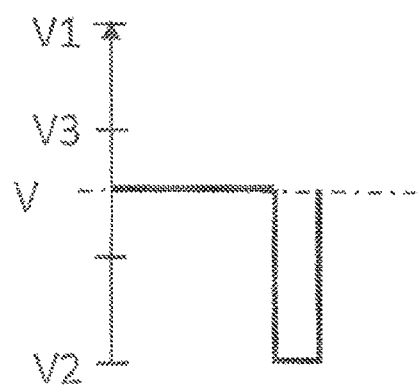
FIG.9(c')
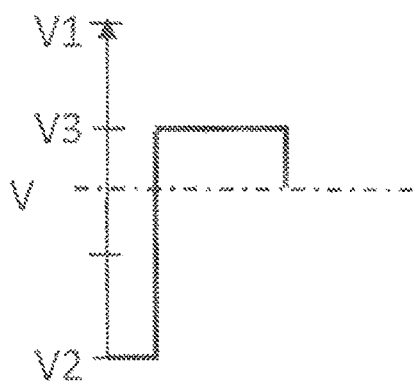
FIG.9(c")
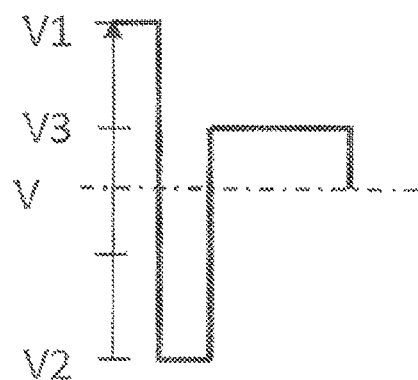

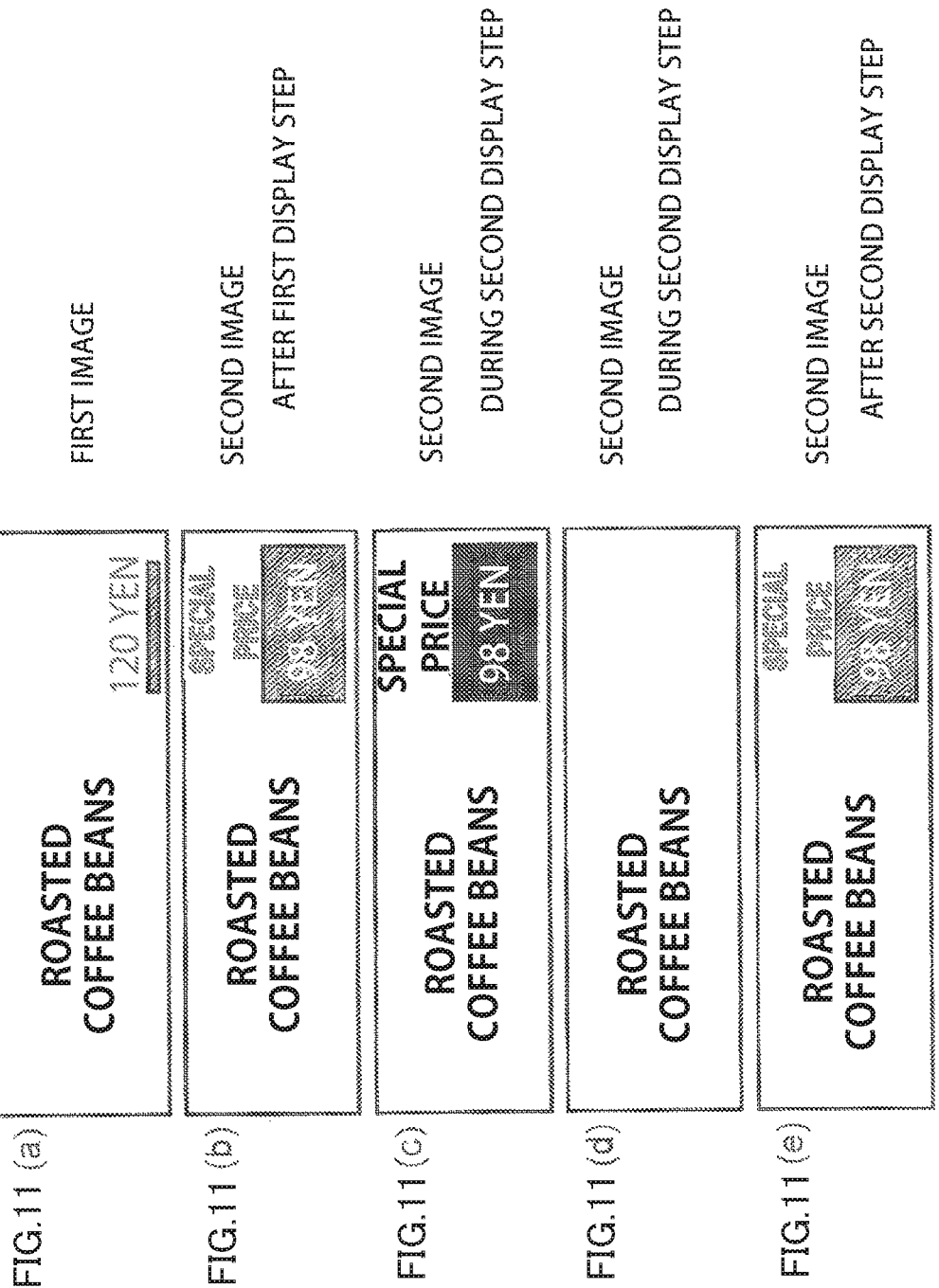

DISPLAY DEVICE AND DRIVING METHOD

CROSS-REFERENCE TO RELATED APPLICATIONS

The present application is a continuation of International Application No. PCT/JP2017/043728, filed Dec. 6, 2017, which is based upon and claims the benefits of priority to Japanese Application No. 2017-001141, filed Jan. 6, 2017. The entire contents of all of the above applications are incorporated herein by reference.

BACKGROUND OF THE INVENTION

Field of the Invention

The present invention relates to a low-power-consumption display device provided with a display panel which has a memory effect and is capable of display using movement of charged particles, and a driving method.

Discussion of the Background

Liquid crystal displays as thin display devices have been widely used for various electronic devices and are also used recently for computers or large color displays such as of televisions. Plasma displays are also used as large color displays for televisions. Liquid crystal displays or plasma displays are much thinner than CRT display devices. However, liquid crystal displays or plasma displays are not sufficiently thin for some usages, or cannot be bent. If these liquid crystal displays or plasma displays are to be used as displays for mobile devices, power consumption is desired to be even more reduced.

As display devices with even more reduced thickness and power consumption, there have been developed display panels called electronic paper which uses electrophoretic display elements. These display panels of electronic paper are being tested for use in electronic books, electronic newspapers, electronic advertising boards, electronic direction signs, and the like. Such a display panel using electrophoretic display (EPD) elements is provided with an image display layer which includes a pair of substrates having respective electrodes in the opposing surfaces with charged particles being encapsulated therebetween. The display panel is configured to display an image by allowing the charged particles to electrophoretically move according to the polarity of the voltage applied across the electrodes of the pair of substrates.

Such an electrophoretic display panel allows charged particles to stay still even when drive voltage is no longer applied across the electrodes. This means that the electrophoretic display panel has a memory effect and thus can maintain the state of displaying an image even when the drive power is zero. These electrophoretic display panels, which are driven with very little electrical power, are expected to be used as display devices for mobile devices, such as wrist watches or mobile phones, which should have low power consumption.

Recently, there is a great need for colorization of these electrophoretic display panels. To achieve colorization, a majority of electrophoretic display panels use color filters. For example, in the case of a configuration including pixels of red, green, blue and white and using a color filter, each color will have an area that is reduced to ¼ of the area compared to the case of using no color filter. For this issue, the following measures are being taken.

PTL 1 describes a display device using three types of electrophoretic particles, and a driving method therefor. PTL 1 describes that the first type particles are black, the second type particles are white, and the third type particles are ones with a color selected from the group consisting of red, green, blue, cyan, magenta and yellow. This type of display device enables display with white and black, and one more color. Use of the display device of PTL 1 enables display with one additional color, although not full color. This display has an appealing power similar to two-color print advertisements and can attract the attention of observers. Since PTL 1 describes only a basic driving method for the three types of particles, a driving method for improving display performance is being sought.

PTL 1: JP 2015-532461 T

SUMMARY OF THE INVENTION

According to an aspect of the present invention, a display device includes a pair of substrates having surfaces facing each other and electrodes formed on the surfaces, respectively, a display medium having a memory effect and formed between the pair of substrates, and a drive unit that applies a drive voltage to the display medium. The display medium includes charged particles encapsulated therein such that movement of the charged particles based on a voltage applied by the drive unit provides display, and the charged particles include first particles for displaying a first color with application of a first voltage, second particles for displaying a second color with application of a second voltage having a polarity different from a polarity of the first voltage, and third particles for displaying a third color with application of a third voltage which has the same polarity as the polarity of the first voltage and an absolute value smaller than an absolute value of the first voltage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a plan view illustrating an electrophoretic display device according to an embodiment of the present invention.

FIG. 3 is a cross-sectional view illustrating an electrophoretic display device according to an embodiment of the present invention.

FIGS. 4(*a*)-4(*c*), 4(*a'*)-4(*c'*) and 4(*c"*) are diagrams each illustrating an example of a drive waveform according to an embodiment of the present invention.

FIGS. 5(*aa*), 5(*ab*), 5(*ac*), 5(*ba*), 5(*bb*), 5(*bc*), 5(*ca*), 5(*cb*) and 5(*cc*) are diagrams each illustrating an example of a drive waveform according to an embodiment of the present invention.

FIGS. 6(a)-6(c) and 6(c') are cross-sectional views each illustrating an electrophoretic display device according to an embodiment of the present invention.

FIGS. 7(a)-7(c) are cross-sectional views each illustrating an electrophoretic display device according to an embodiment of the present invention.

FIGS. 8(a), 8(b), 8(ac), 8(bc) and 8(dc) are diagrams illustrating an example of a drive waveform according to an embodiment of the present invention.

FIGS. 9(a), 9(b), 9(c') and 9(c") are diagrams illustrating an example of a drive waveform according to an embodiment of the present invention.

FIGS. 11(a)-11(e) are diagrams illustrating display examples according to an embodiment of the present invention.

DESCRIPTION OF THE EMBODIMENTS

Figure 1A:
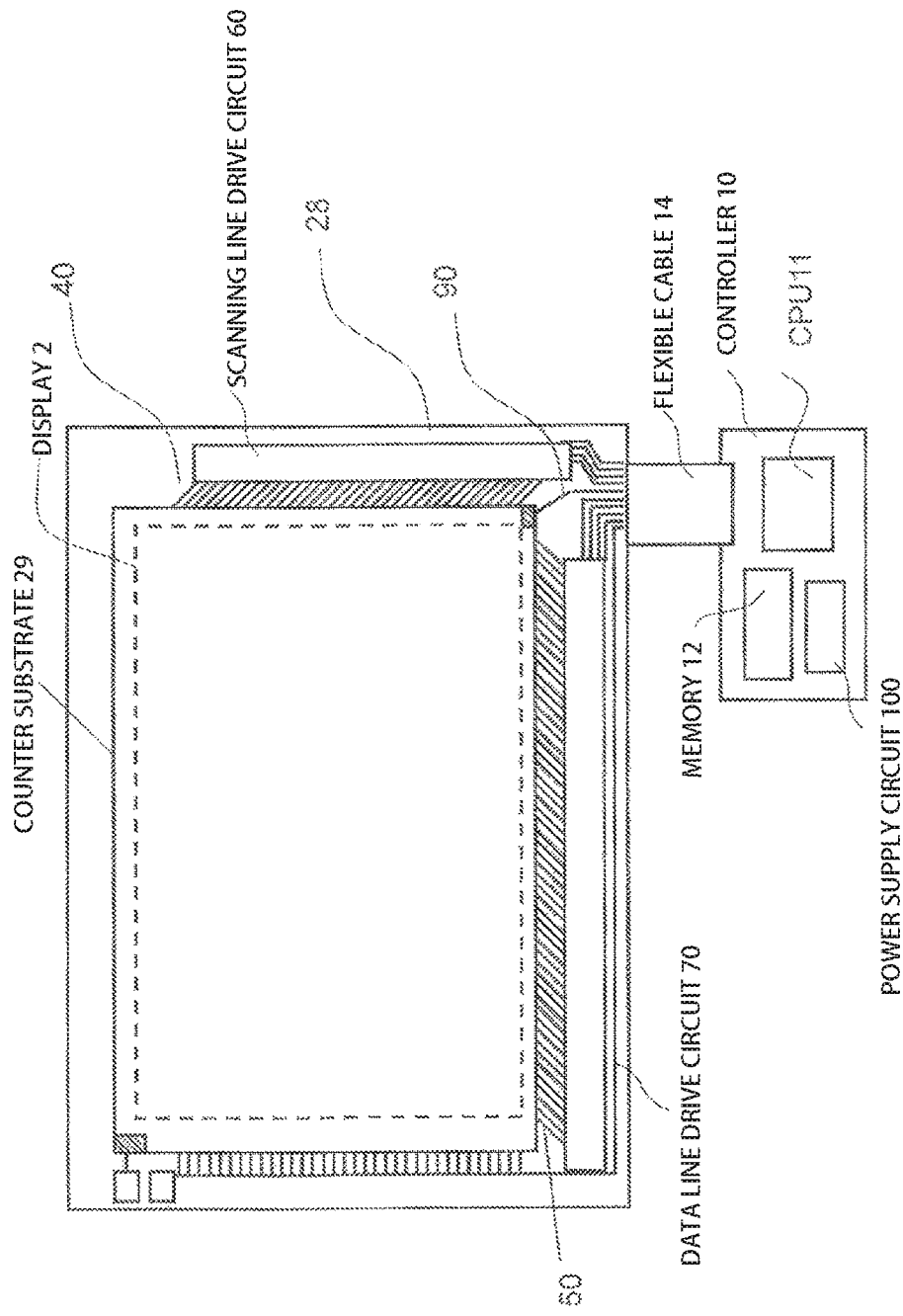
FIG. 1A is a plan view illustrating an electrophoretic display device according to an embodiment of the present invention.

The embodiments will now be described with reference to the accompanying drawings, wherein like reference numerals designate corresponding or identical elements throughout the various drawings.

With reference to the drawings, an electrophoretic display device according to the present embodiment and a driving method therefor will be described. In the following embodiment, an electrophoretic display device according to the embodiment of the present invention will be described by way of an example of an electrophoretic display device based on an active matrix drive system. However, the configuration may be based on a segmented system or the like.

Figure 1B:
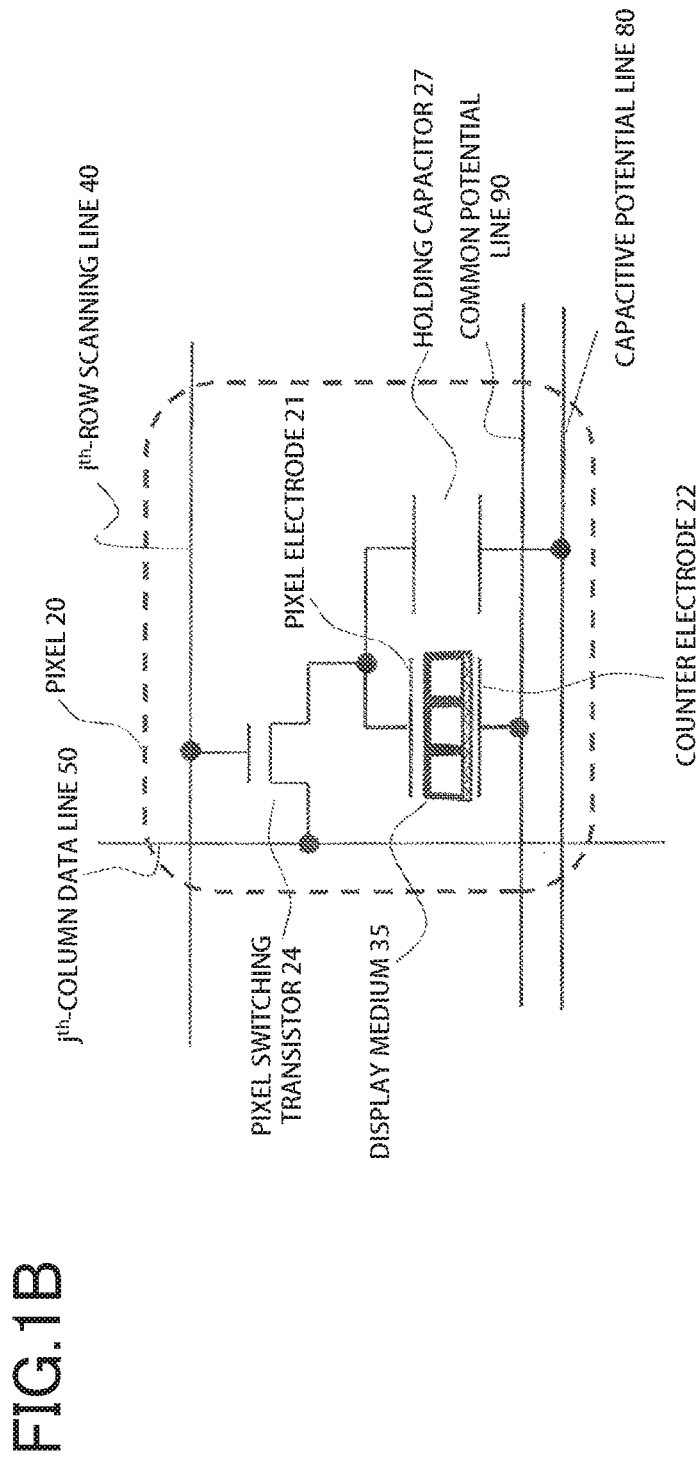
FIG. 1B is an equivalent circuit diagram illustrating an electrical configuration of a pixel according to an embodiment of the present invention.

FIG. 1A is a diagram illustrating a peripheral configuration of a display of an electrophoretic display device 1 according to the present embodiment. In FIG. 1A, the electrophoretic display device 1 of the present embodiment is based on an active matrix drive system and includes a display 2, a controller 10, a scanning line drive circuit 60, and a data line drive circuit 70. The controller 10, which is connected to the display via a flexible cable 14, includes a CPU 11, a memory 12, and a power supply circuit 100. FIG. 1B shows a pixel 20 including a pixel switching transistor 24, a pixel electrode 21, a counter electrode 22, a display medium 35, and a holding capacitor 27. The counter electrode 22 is connected to a common potential line 90, while the holding capacitor 27 is connected to a capacitor potential line 80.

FIG. 1B shows an example of an $i^{th}$-row $j^{th}$-column pixel 20. The display 2 is provided with m-row×n-column pixels 20 which are provided in a matrix arrangement (arrayed two-dimensionally), with m scanning lines 40 (Y1, Y2, ..., Yi, ..., Ym) intersecting with n data lines 50 (X1, X2, ..., Xj, ..., Xn). Specifically, the m scanning lines 40 extend in the row direction (i.e. horizontal direction in FIG. 1B), and n data lines 50 extend in the column direction (i.e. vertical direction in FIG. 1B). The pixels 20 are disposed at respective intersections of the m scanning lines 40 and the n data lines 50.

The controller 10 controls operations of the scanning line drive circuit 60 and the data line drive circuit 70 using the CPU 11, the memory 12, the power supply circuit 100, and the like. The controller 10 supplies, for example, a timing signal, such as a clock signal or a start pulse, to individual circuits.

The scanning line drive circuit 60 sequentially supplies pulsed scanning signals to the scanning lines Y1, Y2, Ym during a predetermined frame period under control of the controller 10.

The data line drive circuit 70 supplies data potentials to the data lines X1, X2, Xn under control of the controller 10. The data potential can use a reference potential GND (e.g., 0 V), a high potential V1 (e.g., +15 V) or a low potential V2 (e.g., −15 V), a potential V3 (e.g., +4V) for third particles, or the like.

The controller 10 supplies a common potential Vcom (a potential that is the same as Vgf in the present embodiment) to the common potential line 90. Since the controller 10 includes the memory 12, a displayed image can be stored before being rewritten. In the embodiment of the present invention, writing can be performed with a maximal drive waveform by comparing an image before being rewritten with a new image.

The pixel switching transistor 24 is configured with, for example, an N-type transistor which, however, may instead be a P-type. The pixel switching transistor 24 includes a gate electrically connected to the scanning lines 40, a source electrically connected to the data lines 50, and a drain electrically connected to the pixel electrode 21 and the holding capacitor 27. The pixel switching transistor 24 outputs a data potential supplied from the data line drive circuit 70 via the data lines 50, to the pixel electrode 21 and the holding capacitor 27, at a time point when a pulsed scanning signal is supplied from the scanning line drive circuit 60 via the scanning lines 40.

The pixel electrode 21 receives a data potential from the data line drive circuit 70 via the data lines 50 and the pixel switching transistor 24. The pixel electrode 21 is disposed so as to face the counter electrode 22 via the display medium 35.

The counter electrode 22 is electrically connected to the common potential line 90 to which the common potential Vcom is supplied.

For example, the display medium 35 includes microcups 23 which are filled with charged particles 30 and a display solvent 34 and sealed with a sealing member 25. The present example shows a microcup-based display device. However, the display device may include a display medium 35 based on other materials, such as microcapsules. The charged particles 30 move only when an electric field is applied, and do not move when no electric field is applied, and maintain the displayed image as it is. In other words, the charged particles 30 have a memory effect for the displayed image.

The holding capacitor 27 is formed of a pair of electrodes facing each other via a dielectric film. One electrode is electrically connected to the pixel electrode 21 and the pixel switching transistor 24, and the other electrode is electrically connected to the capacitor potential line 80 (constant potential). The holding capacitor 27 is capable of maintaining a data potential for a predetermined period.

Figure 2B:
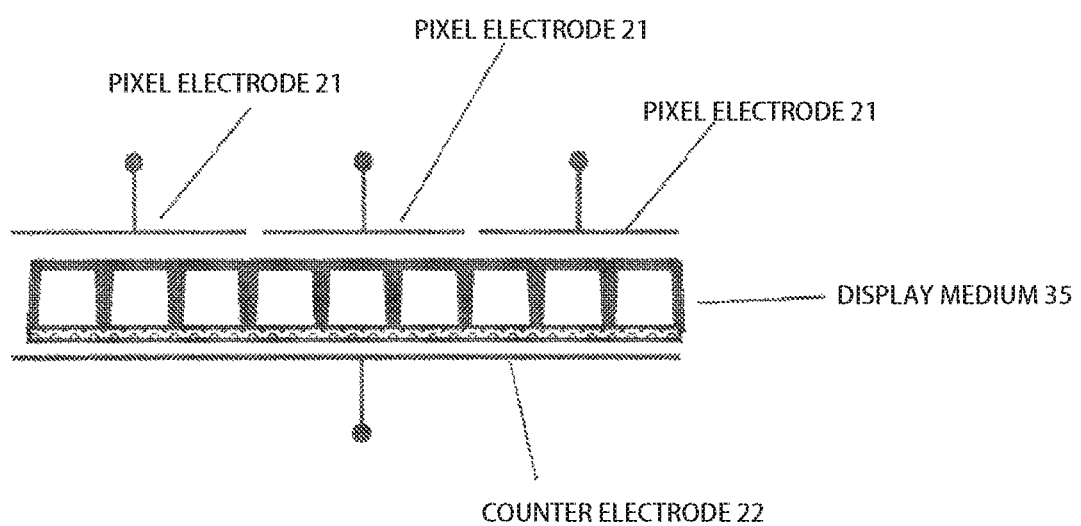
FIG. 2B is an equivalent circuit diagram illustrating an electrical configuration of pixels according to an embodiment of the present invention.
Figure 10:
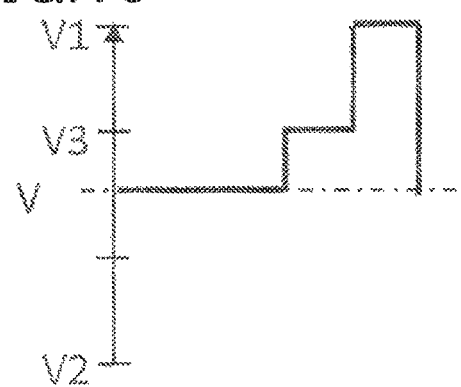
FIG. 10 is a diagram illustrating an example of a drive waveform according to an embodiment of the present invention.

FIG. 2A shows an example of a segmented electrophoretic display device 1. A segmented device displays an image with a configuration that is the same as that of the pixel electrodes 21. FIG. 2B shows a wiring diagram of a segmented device. A display medium 35 is sandwiched between a counter electrode 22 and each pixel electrode 21. When a rewriting voltage is applied to the segmented pixel electrodes 22, the display color changes.

Referring now to FIG. 3, a specific configuration of a display of the electrophoretic display device of the present embodiment will be described.

FIG. 3 is a partial cross-sectional view illustrating the display 2 of the electrophoretic display device 1 according to the present embodiment. As shown in FIG. 3, each pixel 20 is configured to sandwich the display medium 35 between a substrate 28 and a counter substrate 29. The present embodiment will be described assuming that an image is displayed on the counter substrate 29 side.

The substrate 28 may be made, for example, of glass, plastic, or the like. Although not shown, the substrate 28 is provided thereon with a laminate structure incorporating the pixel switching transistors 24, the holding capacitors 27, the scanning lines 40, the data lines 50, the common potential line 90, and the like which have been described referring to FIG. 1B. The laminate structure has an upper layer which is provided with a plurality of pixel electrodes 21 in a matrix arrangement.

For example, the counter substrate 29 is a transparent substrate made of glass, plastic, or the like. The counter substrate 29 has a surface facing the substrate 28, which is provided with a counter electrode 22 that is formed closely facing the plurality of pixel electrodes 21. The counter electrodes 22 are made of an electrically conductive transparent material, such as indium tin oxide (ITO) or indium zinc oxide (IZO).

The display medium 35 is obtained by dispersing the charged particles 30 in the display solvent 34 which is filled in the microcups 23, and sealing the microcups 23 with the sealing member 25. The charged particles 30 contain first particles 31, second particles 32, third particles 33, and the like. For example, the microcups 23 are made of plastic, such as a thermosetting resin or a UV curable resin, or other materials. For example, the sealing member 25 is made of plastic, such as a thermosetting resin or a UV curable resin, or other materials.

The display solvent 34 may be water, an alcohol-based solvent such as methanol, ethanol, isopropanol, butanol, octanol or methyl cellosolve, esters such as ethyl acetate and butyl acetate, ketones such as acetone, methyl ethyl ketone and methyl isobutyl ketone, an aliphatic hydrocarbon such as pentane, hexane or octane, an alicyclic hydrocarbon such as cyclohexane or methylcyclohexane, an aromatic hydrocarbon such as benzene, toluene or benzenes having a long chain alkyl group such as xylene, hexylbenzene, butylbenzene, octyl benzene, nonyl benzene, decyl benzene, undecyl benzene, dodecyl benzene, tridecyl benzene and tetradecyl benzene, halogenated hydrocarbons such as methylene chloride, chloroform, tetrachloromethane or 1,2-dichloroethane, carboxylates, or other oils. These materials may be used singly or as a mixture of two or more. The solvent for dispersion may contain a detergent.

Examples of white particles may include particles (polymers or colloids) comprising white pigments such as titanium dioxide, zinc flower (zinc oxide), antimony trioxide, aluminum oxide, zirconium oxide, barium sulfate, and lead sulfate.

Examples of black particles may include particles (polymers or colloids) comprising black pigments such as manganese ferrite black spinel, copper chromite black spinel, aniline black, and carbon black.

The third type pigment may have a color, for example, of red, green, blue, magenta, cyan, yellow, or the like. Pigments for the particles of this type may include, but are not limited to, C.I. pigments PR254, PR122, PR149, PG36, PG58, PG7, PB28, PB15:3, PY138, PY150, PY155 or PY20.

These pigments may additionally contain, as necessary, a charge control agent comprising particles such as of electrolyte, detergent, metal soap, resin, rubber, oil, varnish or compound, a dispersant such as titanium-based coupling agent, aluminum based coupling agent or silane-based coupling agent, a lubricant, a stabilizer, or the like.

In the present embodiment, the first particles have a first color and provide the first color when a first voltage is applied thereto. The second particles have a second color and provide the second color when a second voltage with a polarity different from that of the first voltage is applied thereto. The third particles have a third color and provide the third color when a third voltage with the same polarity as that of the first voltage and with an absolute value smaller than the first voltage is applied thereto. When a first image is rewritten to produce a second image, a first display step and a second display step are performed. In the first display step, the second image is temporarily produced. In the following second display step, portions with the first color and the second color in the second image remain as they are, and only portions with the third color are changed in color and then again restored to the third color.

As shown in FIG. 3, the display 2 includes the display medium 35 having a memory effect. The display medium 35 includes a pair of substrates, i.e. the substrate 28 and the counter substrate 29, having respective surfaces which face each other and are respectively provided with the pixel electrodes 21 and the counter electrode 22. The charged particles 30 are encapsulated between the substrate 28 and the counter substrate 29. The display medium 35 is capable of display using the movement of the charged particles. The display medium 35 also includes a drive unit, not shown in FIG. 3, which applies a drive voltage across the pixel electrodes 21 and the counter electrode 22. The charged particles 30 comprise at least three types of particles 31, 32 and 33. The first particles 31 have a first color and provide the first color when a first voltage is applied thereto. The second particles 32 have a second color and provide the second color when a second voltage with a polarity different from that of the first voltage is applied thereto. The third particles 33 have a third color and provide the third color when a third voltage with the same polarity as that of the first voltage and with an absolute value smaller than the first voltage is applied thereto.

The first, second and third voltages are voltages applied across the pixel electrodes 21 and the counter electrode 22. If 0 V is applied to the counter electrode 22, the voltage is equal to the voltage applied to the pixel electrodes 21.

A first voltage $V1$ suitable for displaying the first color, a second voltage $V2$ suitable for displaying the second color and a third voltage $V3$ suitable for displaying the third color have a relationship expressed by $V1>V3>0>V2$ in the case where the first and third particles are positively charged and the second particles are negatively charged. In the case where the first and third particles are negatively charged and the second particles are positively charged, a relationship $V2>0>V3>V1$ is established.

The first and second colors, which are in an inverse polarity relationship and require a large voltage for optimal driving, are limiting colors of the applied voltage. Specifically, if a voltage with the same polarity as that of the first voltage $V1$ and with an absolute value larger than that of the first voltage $V1$ is applied to the first particles, the resultant color is the first color. If a voltage with the same polarity as that of the second voltage $V2$ and with an absolute value larger than that of the second voltage $V2$ is applied to the second particles, the resultant color is the second color. Thus, these color states are stable. A suitable duration of application of the first voltage $V1$ may be 10 ms or more and 1,000 ms or less. A suitable duration of application of the second voltage V2 may be 10 ms or more and 1,000 ms or less.

Since the third color requires an optimal drive voltage V3 whose absolute value is smaller than those of the first and second voltages V1 and V2, the third color is not a limiting color of the applied voltage. If a voltage with the same polarity as that of the third voltage V3 and with an absolute value slightly larger than that of the third voltage V3 is applied to the third particles, the resultant color is a mixture of the third and first colors. Specifically, control of the third particles is in competition with that of the first particles. Therefore, control of the third color is more difficult in principle than control of the first or second color. A suitable duration of application of the third voltage V3 may be 100 ms or more and 10,000 ms or less.

For the reasons as described above, the third color tends to be more uneven than the first or second color. In particular, it is difficult for portions which have been in the first, second and third colors in the first image to have the third color at the same brightness and chroma level in the subsequently displayed second image. The third color may be precisely controlled if drive waveforms are more finely (complexly) combined. However, this may increase time for writing. Moreover, this may delay provision of information.

In the present embodiment, as will be described below, a short writing waveform is used in the first display step to write a second image to promptly provide information. Then, the color of only the third color portions of the second image is changed, and then the third color is restored. This may reduce the influence of history in the third color portions and reduce color unevenness of the third color portions.

The first, second and third particles may have colors different from each other, but colors of these particles are not particularly limited. As an example, however, the first particles may be black, the second particles may be white, and the third particles may be red.

The method of rewriting may be one in which a waveform is determined only based on the subsequent display (second image) data without relying on the previous display (first image) data, or one in which a waveform is determined based on both the previous and subsequent display data.

With reference to FIGS. 2A and 2B, specific waveforms will be described. FIGS. 4(a)-4(c), 4(a')-4(c') and 4(c'') are diagrams showing examples of drive waveforms without using the previous display data. FIG. 4(a) shows an example in the case of writing (displaying) the first particles (black). Herein, V1 is a writing voltage (first voltage) for the first particles (black). Furthermore, V2 is a writing voltage (second voltage) for the second particles (white), and V3 is a writing voltage (third voltage) for the third particles (red). The applied voltage may, for example, be +15 V as the first voltage V1, −15 V as the second voltage V2, and 4 V as the third voltage V3.

First, in the first display step, pulses are applied in the order, for example, of V2, V1 and V2 to eliminate (refresh) the previous image. Then, V1 is applied to write the first particles (black). Alternatively, as shown in FIG. 8(a), the waveform may be one for applying V2 and then V1. FIG. 6(a) is a schematic cross-sectional diagram showing writing of the first particles. When writing is performed with V1, the first particles having higher electrophoretic speed appear at the display surface, while the third particles having lower speed are located beneath the first particles. The second particles having an inverse polarity move to the non-display surface.

FIG. 4(b) shows the case of writing the second particles (white). Since the second particles (white) have a polarity that is the reverse of the first particles, the waveform shows pulses that are reverse of FIG. 4(a). Alternatively, as shown in FIG. 8(b), the waveform may be one for applying V1 and then V2. FIG. 6(b) is a schematic cross-sectional diagram showing writing of the second particles. The second particles appear at the display surface, while the first particles having higher electrophoretic speed are collected to the non-display surface and the third particles are located above the first particles (at the middle of the microcup).

FIG. 4(c) shows the case of writing the third particles (red). As described above, since a longer time is required for writing the third particles, the time for refreshing (application of V2 in this example) is reduced and time for applying V3 is increased. FIG. 6(c) is a schematic cross-sectional diagram showing writing of the third particles. The first particles hardly move due to application of V3 that is the writing voltage for the third particles. The third particles gradually move but are yet to appear at the display surface due to the slower movement speed. The second particles, which have been on the display surface side due to refreshing in the earlier part of the drive wave, are further toward the non-display surface. This state appears to be whitish red for the observer.

Then, in the second display step, the color of only the third color portions is changed and then restored to the third color. By temporarily displaying the first or second color and then displaying the third color again, display unevenness of the third particles is reduced, thereby improving chroma level of red. By temporarily performing display with the first or second particles having a speed different from that of the third particles, the first or second particles can be separated from the third particles to thereby alleviate display unevenness. At the same time, since the amount of the third particles appearing at the display surface increases, red chroma level improves. As a result of the second display step, effect of displaying the third color at an earlier stage is obtained in the first display step, unevenness of the third color is improved, and the effect of making the third color more noticeable is obtained during the second display step.

A specific example is shown in FIG. 4(c'). FIG. 4(c') shows an example in the case of displaying the second color and then writing the third particles again. Following the first display step shown in FIG. 4(c), writing similar to the waveform of FIG. 4(c) is iterated twice as a second display step. Alternatively, the patterns of FIGS. 9 (c') and 9(c'') may be used. In this way of writing, the chroma level of the third particles (red) is improved and unevenness is reduced. FIG. 6(c') is a schematic cross-sectional diagram showing this case. Iterating application of V2 and V3, the third particles move up toward the display surface side.

As shown in FIGS. 4(a'), 9(a) and 10, any one of 0 V, the first voltage V1 and the third voltage V3 only is applied to the first color portions of the second image in the second display step, and no second voltage V2 is applied. Thus, the first color portions are persistently maintained with the first color. It should be noted that if the third voltage V3 is applied in the first color display state, the third color may not be displayed because the vicinity of the display surface is occupied by the first particles.

As shown in FIGS. 4(b') and 9(b), either one of 0 V and the second voltage V2 is only applied to the second color portions of the second image in the second display step, and neither V1 nor V3 is applied. Thus, the second color portions are persistently maintained with the second color.

FIGS. 5(aa), 5(ab), 5(ac), 5(ba), 5(bb), 5(bc), 5(ca), 5(cb) and 5(cc) are diagrams showing examples of drive waveforms for using both the previous and the subsequent display data. FIG. 5(aa) shows a waveform applied to the first color pixels of the previous and the subsequent display data. First, the second voltage V2, for example, is applied to the first color of the previous display data to eliminate the first color. This is followed by the waveform including V2 and V1, and the first display step ends with V1. The second display step is configured by 0 V, V1 or V3. The second display step preferably ends with V1. The second display step may be iterated. In FIG. 5(aa), the second display step is iterated twice.

FIG. 5(ab) shows a waveform applied to the first color pixels of the previous display data, and to the second color pixels of the subsequent display data. First, the second voltage V2, for example, is applied to the first color of the previous display data to eliminate the first color. This is followed by the waveform including V1 and V2, and the first display step ends with V2. The second display step is configured by 0 V or V2. The second display step preferably ends with V2. The second display step may be iterated. In FIG. 5(ab), the second display step is iterated twice. FIG. 5(ac) shows a waveform applied to the first color pixels of the previous display data, and to the third color pixels of the subsequent display data. First, the second voltage V2, for example, is applied to the first color of the previous display data to eliminate the first color. This is followed by the waveform at least including V3, and the first display step ends V3. The second display step is configured by 0 V, V1, V2 or V3, and includes at least V1 or V2 and also V3. The second display step ends with V3. The second display step may be iterated. In FIG. 5(ac), the second display step is iterated twice.

FIG. 5(ba) shows a waveform applied to the second color pixels of the previous display data, and to the first color pixels of the subsequent display data. First, the first voltage V1, for example, is applied to the second color of the previous display data to eliminate the second color. This is followed by the waveform including V2 and V1, and the first display step ends with V1. The second display step is configured by 0 V, V1 or V3. The second display step preferably ends with V1. The second display step may be iterated. In FIG. 5(ba), the second display step is iterated twice. Alternatively, the waveform of FIG. 8(a) may be used.

FIG. 5(bb) shows a waveform applied to the second color pixels of the previous display data, and to the second color pixels of the subsequent display data. First, the first voltage V1, for example, is applied to the second color of the previous display data to eliminate the second color. This is followed by the waveform including V1 and V2, and the first display step ends with V2. The second display step is configured by 0 V or V2. The second display step preferably ends with V2. The second display step may be iterated. In FIG. 5(bb), the second display step is iterated twice. Alternatively, the waveform of FIG. 8(b) may be used.

FIG. 5(bc) shows a waveform applied to the second color pixels of the previous display data, and to the third color pixels of the subsequent display data. First, the first voltage V1, for example, is applied to the second color of the previous display data to eliminate the second color. This is followed by the waveform including at least V3, and the first display step ends with V3. The second display step is configured by 0 V, V1, V2 or V3, and includes at least V1 or V2 and also V3. The second display step ends with V3. The second display step may be iterated. In FIG. 5(bc), the second display step is iterated twice.

FIG. 5(ca) shows a waveform applied to the third color pixels of the previous display data, and to the first color pixels of the subsequent display data. Here, no voltage is applied to the third color of the previous display data to eliminate the third color. However, for example, V2 may be applied for only a short time. This is followed by the waveform including V2 and V1, and the first display step ends with V1. The second display step is configured by 0 V, V1 or V3. The second display step preferably ends with V1. The second display step may be iterated. In FIG. 5(ca), the second display step is iterated twice.

FIG. 5(cb) shows a waveform applied to the third color pixels of the previous display data, and to the second color pixels of the subsequent display data. Here, no voltage is applied to the third color of the previous display data to eliminate the third color. However, for example, V2 may be applied for only a short time. This is followed by the waveform including V1 and V2, and the first display step ends with V2. The second display step is configured by 0 V or V2. The second display step preferably ends with V2. The second display step may be iterated. In FIG. 5(cb), the second display step is iterated twice.

FIG. 5(cc) shows a waveform applied to the third color pixels of the previous display data, and to the third color pixels of the subsequent display data. Here, no voltage is applied to the third color of the previous display data to eliminate the third color. However, for example, V2 may be applied for only a short time. This is followed by the waveform including at least V3, and the first display step ends with V3. The second display step is configured by 0 V, V1, V2 or V3, and includes at least V1 or V2 and also V3. The second display step ends with V3. The second display step may be iterated. In FIG. 5(cc), the second display step is iterated twice.

In the second display steps described above, the third color portions of the second image are ensured to display the third color again via at least the first color or the second color. As a result, effects as set forth below are obtained.

For example, in FIG. 4(c'), the third color is displayed via the second color. In the subsequent FIG. 4(c"), the third color is displayed via the first and second colors. Via the first or second color, the third particles can be effectively separated from the first and second particles to thereby reduce unevenness in displayed color and improve chroma level. In the examples shown in FIG. 4(c"), the first, second and third voltages are applied in the first display step, and then writing with a waveform similar to that of the first display step is iterated twice in the second display step. Thus, the influence of the first image is reduced and unevenness in the third color is eliminated.

In the first display steps described above, the first color portions are ensured to display the first color via at least the second color, the second color portions are ensured to display the second color via at least the first color, and the third color portions are ensured to display the third color via at least the first color or the second color. As a result, effects set forth below are obtained.

For example, as shown in FIG. 4(a), the first color portions display the first color via the second color having a reverse polarity. As shown in FIG. 4(b), the second color portions display the second color via the first color having a reverse polarity. By writing with a reverse polarity, particles can move freely and cohesion of particles is prevented, thereby reducing formation of an afterimage of the previous image.

For example, the first color may be white or black, the second color may be black or white that is a color different from the first color, and the third color may be red. In this case, white, black and red can be promptly displayed in the first display step, and red can be displayed with less unevenness in the second display step. Furthermore, since red that produces the third color is restored in the second display step via another color, a blinking effect is created and thus more attention is attracted.

With this control, unevenness of the third color after the second display step can be made smaller than the unevenness of the third color region after the first display step. As described above, since prompt display has a higher priority in the first display step, unevenness of the third color, which is difficult to control, is unavoidably greater than the first or second color. By performing writing of this third color in the second display step, unevenness of the third color can be reduced.

Furthermore, iteration of the second display step can even more reduce unevenness of the third color. For example, in the example shown in FIG. 4(c') or 4(c''), the second display step is iterated twice to even more reduce color unevenness compared to performing the second display step only once.

The electrodes are configured by pixel electrodes formed on a first substrate, and a counter electrode formed on a second substrate. In the method of applying the drive voltage, 0 V is applied to the counter electrode and a first voltage, a second voltage, a third voltage or 0 V is applied to the pixel electrodes. The first display step is a combination of a plurality of sub-steps of applying the first voltage, the second voltage, the third voltage or 0 V to the pixel electrodes. The second display step is also a combination of a plurality of sub-steps of applying the first voltage, the second voltage, the third voltage or 0 V to the pixel electrodes.

When the pixel electrodes 21 are directly connected to a drive unit as shown in FIG. 2A and when the voltage of the counter electrode 22 of FIG. 2B is 0 V, V1 may be applied to the pixel electrodes 21 so that the first color is displayed as seen from the counter electrode 22 side. If V2 is applied to the pixel electrodes 21, the second color may be displayed as seen from the counter electrode 22 side. If V3 is applied to the pixel electrodes 21 in an initial state, the third color may be displayed as seen from the counter electrode 22 side. The initial state herein refers to a state where at least a color other than the first color is displayed.

By applying the first voltage, the second voltage, the third voltage or 0 V in the first and second display steps, the desired particles can be effectively moved to the display surface. Compared to the case of using only the voltage of positive polarity, the third particles can be selectively moved to the display surface. FIG. 7(a) shows an example of the case of driving using only the first voltage. The third particles appear at the front surface, while the first particles of the same polarity have also moved to the front surface. FIG. 7(b) shows the case of applying the second voltage after that. Application of the second voltage allows both the first and third particles to move toward the non-display surface. However, since the movement speed of the first particles is higher than that of the third particles, more third particles resultantly remain at the display surface side. FIG. 7(c) shows an example of the case of applying the third voltage again. Since the third particles are on top before the voltage application, the third particles remain on the display surface as they are. The first particles do not move much due to application of the third voltage and thus do not move up to the display surface.

Although not shown, driving temporarily stops in the case of applying 0 V. Accordingly, particles move only slightly due to the inertia of the electrophoretic particles or the convection of the solvent filled in the microcup.

The electrodes are configured by pixel electrodes which are connected to an array of thin film transistors formed on a first substrate, and a counter electrode which is formed on a second substrate. The thin film transistors are respectively arrayed near intersections of a plurality of gate wires and a plurality of source wires. In the method of applying the drive voltage, a predetermined voltage is applied to the counter electrode, and a selective voltage is applied to the gate wires in a state where a first voltage, a second voltage, a third voltage or 0 V is applied to the source wires to thereby write the first voltage, the second voltage, the third voltage or 0 V at the pixel electrodes. The first display step is a combination of a plurality of sub-steps of applying the first voltage, the second voltage, the third voltage or 0 V to the pixel electrodes. The second display step is also a combination of a plurality of sub-steps of applying the first voltage, the second voltage, the third voltage or 0 V to the pixel electrodes.

FIGS. 1A and 1B show the case where an electrophoretic device 1 includes pixel electrodes 21 connected to an array of thin film transistors (TFTs). In this case, a high voltage VGH or a low voltage VGL is applied to the gate wires by the scanning line driver 60. In the case of n-channel TFTs, VGL is a non-selective potential, while VGH is a selective potential. In the case of p-channel TFTs, VGH is a non-selective potential, while VGL is a selective potential. For example, VGH=+20 V, and VGL=−20 V.

At the same time, as a data potential, the first voltage V1, the second voltage V2, the third voltage V3 or 0 V is applied to the source wires by the data line driver 70. With a selected row of TFTs being turned on, the applied data potential is written into the pixel electrodes 21. By sequentially changing the selected row and the data potential, data potentials are written to the pixel electrodes 21 across the entire image area. This is called line-sequential driving.

It should be noted that each written potential varies by an amount corresponding to a gate-feedthrough voltage Vgf when the gate wire has a non-selective potential and the TFT is turned off. Specifically, the pixels to which the first voltage V1, the second voltage V2, the third voltage V3 or 0 V has been written have a voltage of V1+Vgf, V2+Vgf, V3+Vgf or Vgf. Vgf, which is given based on Formula 1, is negative in the case of n-channel TFTs, and positive in the case of p-channel TFTs.

$$Vgf = \Delta Vg \cdot Cgd/(Cs+Cp+Cgd) \quad \text{(Formula 1)}$$

In the formula, ΔVg is a gate voltage variation when the state of the TFT changes from on to off and thus is VGL−VGH in the case of n-channel TFTs and VGH−VGL in the case of p-channel TFTs, Cgd is a gate-drain capacitance, Cs is a storage capacitance connected to the pixel electrode, and Cp is a capacitive component of the display medium.

By adjusting the potential of the counter electrode 22 to a predetermined value (gate-feedthrough voltage Vgf), the voltage across the pixel electrodes 21 and the counter electrode 22 can be the first voltage V1, the second voltage V2, the third voltage V3 or 0 V.

Use of the thin film transistor array enables dot matrix display. When the individual pixels of the dot matrix are enabled display using a combination of a plurality of sub-steps of applying the first voltage, the second voltage, the third voltage or 0 V, the respective pixels are enabled desired display.

The second display step may include a sub-step of applying the first voltage, a sub-step of applying the third voltage or a sub-step of applying 0 V to the first color portions. Thus, the first color can be rewritten in the second display step, and 0 V application can be maintained. If writing is performed with the third voltage, the third particles do not move to the display surface because the first particles already occupy the vicinity of the counter electrode. Thus, display of the first color can be maintained.

The second display step may include a sub-step of applying the second voltage or a sub-step of applying 0 V to the second color portions. Thus, the second color can be rewritten in the second display step, and the 0 V application can be maintained. Thus, display of the second color can be maintained.

The second display step may include a sub-step of applying the first voltage, a sub-step of applying the second voltage, a sub-step of applying the third voltage or a sub-step of applying 0 V to the third color portions, or may at least include a sub-step of applying the second voltage to the third color portions and may end with a sub-step of applying the third voltage thereto, or may end with a sub-step of applying the third voltage to the third color portions, or may end with a sub-step of applying 0 V after a sub-step of applying the third voltage thereto. Thus, in the second display step, voltage is applied to the third color portions via application of voltage of the second color. Accordingly, particles are more effectively separated. Furthermore, during the second display step, the effect of blinking the third color portions can be created to make these portions more noticeable. After application of the third voltage, voltage application may be directly terminated, or 0 V may be applied.

In the second display step, the last part of the sub-steps of applying the third voltage to the third color portions, the sub-step of applying the first voltage to the first color portions, and the sub-step of applying the second voltage to the second color portions may be simultaneously performed. With the display device described above, since the sub-step of applying the first voltage to the first color portions, the sub-step of applying the second voltage to the second color portions, and the sub-step of applying the third voltage to the third color portions are simultaneously performed in the second display step, spreading of only a specific color is prevented in the written display, which would otherwise be caused by the written display affecting the adjacent pixels. Thus, the second display step can offer display in which written lines have stable width or the like.

In the first display step, the last part of the sub-steps of applying the third voltage to the third color portions, the sub-step of applying the first voltage to the first color portions, and the sub-step of applying the second voltage to the second color portions may be simultaneously performed. With the display device described above, since the sub-step of applying the first voltage to the first color portions, the sub-step of applying the second voltage to the second color portions, and the sub-step of applying the third voltage to the third color portions are simultaneously performed in the first display step, spreading of a specific color is prevented in the written display, which would otherwise be caused by the written display affecting the adjacent pixels. Thus, the first display step can offer display in which written lines have stable width or the like.

EXAMPLES

Examples of the present invention will be described, although it is not limited thereto.

<First Display Step>
<Writing of the First Color>

As shown in FIG. 8(a), with the application of the first voltage V1 (+15 V) for 500 ms, the first and third particles move toward the counter electrode side, while the second particles move toward the pixel electrodes side. In this case, the first particles move faster than the third particles and thus the first color is displayed. However, for charge balance, the first voltage V1 may preferably be applied after application of the second voltage V2 (−15 V) for 500 ms.

<Writing of the Second Color>

As shown in FIG. 8(b), with the application of the second voltage V2 (−15 V) for 500 ms, the second particles move toward the counter electrode side, while the first and third particles move toward the pixel electrodes side. In this case, the second color is displayed. However, for charge balance, the second voltage V2 may preferably be applied after application of the first voltage V1 (+15 V) for 500 ms.

<Writing of the Third Color (No. 1)>

The following description assumes the case where the second color has been initially displayed in the previous image. When the second color has been displayed, a cross section of the display device will be as schematically shown in FIG. 6(b). As shown in FIG. 8(bc), with the application of a writing voltage V3 (+4 V) of the third particles for 4,400 ms, the second particles move to the non-display surface, while the third particles move to the display surface. The first particles do not move much to the upper surface. In this case, as have been described above, the third particles are allowed to move toward the display surface side while the first particles are allowed to move down, in the process of applying the third voltage V3 (+4 V) for 4,400 ms, or specifically, by applying the second voltage V2 (−15 V) of a reverse polarity after lapse of 2,200 ms. If the particles are densely packed, the first or second particles surrounded by the third particles may be carried to the display surface together with the third particles. However, application of a voltage with a reverse polarity can loosen the particles and minimize such carrying.

<Writing of the Third Color (No. 2)>

The following description assumes the case where the first color has been displayed in the previous image. In this case, cross section of the display device will be as schematically shown in FIG. 6(a). As shown in FIG. 8(ac), the device is driven in this case by applying the first voltage Va (+15 V) for 200 ms and the second voltage V2 (−15 V) for 200 ms, and then by applying the third voltage V3 (+4 V) for 4,050 ms. The first particles were required to be moved closer to the non-display surface than the third particles. Therefore, the first particles, which moved faster, had to be moved to the non-display surface by the short-time (200 ms) application of the second voltage V2 (−15 V) having a reverse polarity.

<Writing of the Third Color (No. 3)>

The following description assumes the case where the previous image is a mixture of the first and second particles. If the first and second particles are black and white, respectively, the displayed color is observed to be gray. In this case, as shown in FIG. 8(dc), the second voltage V2 (−15 V) is applied for 250 ms, followed by application of the third voltage V3 (+4 V), for 4,200 ms, for writing the third particles, to move the third particles to the display surface.

<Second Display Step>
<Writing of the First Color>

The first color is not changed in the second display step. Accordingly, as shown in FIG. 9(a), 0 V was applied for 3,000 ms and the first voltage V1 (+15 V) was applied for 100 ms without applying the second voltage V2 (−15 V).

<Writing of the Second Color>

The second color is not changed in the second display step. Accordingly, as shown in FIG. 9(b), 0 V was applied for 3,000 ms and the second voltage V2 (−15 V) was applied for 100 ms without applying the first voltage V1 or the third voltage V3.

<Writing of the Third Color>

In the second display step, the third color is changed to the first color, then to the second color, and then to the third color. As shown in FIG. 9(c"), the first voltage V1 (+15 V) is applied for 100 ms, followed by application of the second voltage V2 (−15 V) for 100 ms, and then the third voltage V3 (+4 V) is applied for 2,900 ms.

<Evaluations>

The device was driven as described above from the state of displaying a first image shown in FIG. 11(a). FIG. 11(b) shows a display state after the first display step. In the red portion (the "special price" portion) had a color unevenness of ΔL*=5.9 Δa*=3.4.

In the subsequent second display step, the display state was as shown in FIG. 11(c), 11(d) or 11(e), and the red portion exerted an effect of blinking. In FIG. 11(e), the red portion (the "special price" portion) had a color unevenness of ΔL*=1.2 Δa*=1.7. It should be noted that ΔL* or Δa* is obtained by subtracting a minimum value from a maximum value among the values at five points measured in the red portion.

The present invention provides, in some aspects, an electrophoretic display device having at least three types of particles, and enabling display of a clear image that a viewer can easily see or an image intended by the creator of the image, and a driving method for an electrophoretic display panel.

A first aspect of the present invention is a display device including: a pair of substrates that have respective surfaces which face each other and are provided with respective electrodes; a display medium that has a memory effect and is disposed between the pair of substrates; and a drive unit that applies a drive voltage to the display medium. The device is characterized in that: the display medium includes charged particles encapsulated therein and provides display by the charged particles moving due to a voltage being applied by the drive unit; the charged particles comprise at least three types of particles, including first particles producing a first color for displaying the first color with application of a first voltage, second particles producing a second color for displaying the second color with application of a second voltage that has a polarity different from that of the first voltage, and third particles producing a third color for displaying the third color with application of a third voltage that has the same polarity as that of the first voltage and has an absolute value smaller than that of the first voltage; and when rewriting a displayed first image to a second image, a first display step, and subsequently a second display step are performed, the first display step being temporarily displaying the second image, the second display step being changing the color of only third color portions in the second image and then restoring the third color, while first color portions and second color portions remain as they are.

In the second display step, the third color portions may be restored to the third color via at least the first color or the second color.

In the first display step, the first color portions may display the first color via at least the second color, the second color portions may display the second color via at least the first color, and the third color portions may display the third color via at least the first color or the second color.

The first color may be white or black, the second color may be black or white that is a color different from the first color, and the third color may be red.

Color unevenness in the third color portions after the second display step may be smaller than color unevenness in the third color portions after the first display step.

The second display step may be iterated a plurality of times.

The electrodes may be pixel electrodes formed on a first substrate, and a counter electrode formed on a second substrate. The drive voltage may be applied by applying 0 V to the counter electrode, and applying the first voltage, the second voltage, the third voltage or 0 V to the pixel electrodes. The first display step may include a combination of a plurality of sub-steps of applying the first voltage, the second voltage, the third voltage or 0 V to the pixel electrodes. The second display step may include a combination of a plurality of sub-steps of applying the first voltage, the second voltage, the third voltage or 0 V to the pixel electrodes.

The electrodes may be configured by pixel electrodes that are connected to an array of thin film transistors formed on a first substrate, and a counter electrode formed on a second substrate. The thin film transistors may be arrayed near respective intersections of a plurality of gate wires and a plurality of source wires, and the drive voltage may be applied by applying a predetermined voltage to the counter electrode, and applying the first voltage, the second voltage, the third voltage or 0 V to the pixel electrode by applying a selective voltage to the gate wires in a state where the first voltage, the second voltage, the third voltage or 0 V is applied to the source wires. The first display step may include a combination of a plurality of sub-steps of applying the first voltage, the second voltage, the third voltage or 0 V to the pixel electrodes. The second display step may include a combination of a plurality of sub-steps of applying the first voltage, the second voltage, the third voltage or 0 V to the pixel electrodes.

The second display step may include a sub-step of applying the first voltage, a sub-step of applying the third voltage or a sub-step of applying 0 V to the first color portions.

The second display step may include a sub-step of applying the second voltage or a sub-step of applying 0 V to the second color portions.

The second display step may include a sub-step of applying the first voltage, a sub-step of applying the second voltage, a sub-step of applying the third voltage or a sub-step of applying 0 V to the third color portions, may have a sub-step of applying at least the second voltage to the third color portions, and may end with a sub-step of applying the third voltage to the third color portions, or may end with a sub-step of applying 0 V to the third color portions after a sub-step of applying the third voltage to the third color portions.

In the second display step, a last part of the sub-steps of applying the third voltage to the third color portions, the sub-step of applying the first voltage to the first color portions, and the sub-step of applying the second voltage to the second color portions may be simultaneously performed.

In the first display step, a last part of the sub-steps of applying the third voltage to the third color portions, the sub-step of applying the first voltage to the first color portions, and the sub-step of applying the second voltage to the second color portions may be simultaneously performed.

Another aspect of the present invention is a driving method for a display device that includes: a pair of substrates that have respective surfaces which face each other and are provided with respective electrodes; a display medium that has a memory effect and is disposed between the pair of substrates; and a drive unit that applies a drive voltage to the display medium: the display medium including charged particles encapsulated therein and providing display by the charged particles moving due to a voltage being applied by the drive unit; and the charged particles comprising at least three types of particles, including first particles producing a first color for displaying the first color with application of a first voltage, second particles producing a second color for displaying the second color with application of a second voltage that has a polarity different from that of the first voltage, and third particles producing a third color for displaying the third color with application of a third voltage that has the same polarity as that of the first voltage and has an absolute value smaller than that of the first voltage. The method includes, when rewriting a displayed first image to a second image, a first display step of temporarily displaying the second image; and a second display step of changing color of only the third color portions in the second image and then restoring the third color, while the first color portions and the second color portions remain as they are.

The electrophoretic display device according to the embodiment of the present invention that includes at least three types of particles achieves an effect of displaying three colors at an earlier stage, an effect of reducing unevenness in the third color which is difficult to display, and an effect of making the third color portions more noticeable. Thus, the display device can display a clear image that a viewer can easily see or an image intended by the creator of the image.

INDUSTRIAL APPLICABILITY

The embodiments of the present invention are useful as an electrophoretic display device enabling display of three colors. In particular, the embodiments of the present invention are useful for message boards for transmitting information, electronic inventory tags, or the like.

REFERENCE SIGNS LIST

1 . . . Electrophoretic display device
2 . . . Display
10 . . . Controller (Drive unit for electrophoretic display device 1)
11 CPU
12 . . . Memory
14 . . . Flexible cable
20 . . . Pixel
21 . . . Pixel electrode
21 . . . Counter electrode
23 . . . Microcup
24 . . . Pixel switching transistor
25 . . . Sealing member
27 . . . Holding capacitor
28 . . . Substrate
29 . . . Counter substrate
30 . . . Charged particles
31 . . . First particles
32 . . . Second particles
33 . . . Third particles
34 . . . Display solvent
35 . . . Display medium
40 . . . Scanning line
50 . . . Data line
60 . . . Scanning line drive circuit
70 . . . Data line drive circuit
80 . . . Capacitor potential line
90 . . . Common potential line Obviously, numerous modifications and variations of the present invention are possible in light of the above teachings. It is therefore to be understood that within the scope of the appended claims, the invention may be practiced otherwise than as specifically described herein.

What is claimed is:

1. A display device, comprising:
a pair of substrates having surfaces facing each other;
a plurality of electrodes formed on the surfaces of the pair of substrates, respectively;
a display medium having a memory effect and formed between the pair of substrates; and
a drive unit comprising circuitry configured to apply drive voltages to the display medium such that when the display medium rewrites a first image to a second image, the circuitry performs a first step in which the second image is temporarily displayed, and a second step in which only third color portions of a third color are changed in the second image and restoring the third color in the third color portions while maintaining first color portions of a first color and second color portions of a second color,
wherein the display medium includes a plurality of charged particles encapsulated therein such that movement of the charged particles based on the drive voltages applied by the circuitry of the drive unit provides display, and the charged particles comprise a plurality of first particles for displaying the first color with application of a first voltage, a plurality of second particles for displaying the second color with application of a second voltage having a polarity different from a polarity of the first voltage, and a plurality of third particles for displaying the third color with application of a third voltage which has the same polarity as the polarity of the first voltage and an absolute value smaller than an absolute value of the first voltage.

2. The display device according to claim 1, wherein the first color is white or black, the second color is black or white and different from the first color, and the third color is red.

3. The display device according to claim 1, wherein the plurality of electrodes comprises a first electrode and a second electrode such that the electrodes comprise pixel electrodes formed on the first substrate, and a counter electrode formed on the second substrate.

4. The display device according to claim 3, wherein the drive voltages to the pixel electrodes are adjusted based on $Vgf=\Delta Vg \cdot Cgd/(Cs+Cp+Cgd)$ to $V1+Vgf$, $V2+Vgf$, $V3+Vgf$, and $0V+Vgf$, where the first voltage is V1, the second voltage is V2, the third voltage is V3, Vgf is a gate-feedthrough voltage, $\Delta Vg$ is a gate voltage variation, Cad is a gate-drain capacitance, Cs is a storage capacitance connected to the pixel electrodes, and Cp is a capacitive component of the display medium.

5. The display device according to claim 1, wherein the plurality of electrodes comprises a first electrode and a second electrode such that the electrodes comprise pixel electrodes connected to an array of thin film transistors formed on the first substrate, and a counter electrode formed on the second substrate, and the thin film transistors are arrayed near respective intersections of a plurality of gate wires and a plurality of source wires.

6. The display device according to claim 5, wherein the chive voltages to the pixel electrodes are adjusted based on Vgf=ΔVg·Cgd/(Cs+Cp+Cgd) to V1+Vgf, V2+Vgf, V3+Vgf, and 0V+Vgf, where the first voltage is V1, the second voltage is V2, the third voltage is V3, Vgf is a gate-feedthrough voltage, ΔVg is a gate voltage variation, Cgd is a gate-drain capacitance, Cs is a storage capacitance connected to the pixel electrodes, and Cp is a capacitive component of the display medium.

7. A method for driving a display device, comprising:
applying drive voltages of a first step to a display medium such that when the display medium rewrites a first image of a display medium to a second image of the display medium, circuitry of a drive unit performs the first step in which the second image is temporarily displayed; and
applying drive voltages of a second step to the display medium such that when rewriting the first image of the display medium to the second image of the display medium, the circuitry of the drive unit performs the second step in which only third color portions of a third color are changed in the second image and the third color is restored in the third color portions while maintaining first color portions of a first color and second color portions of a second color,
wherein the display device comprises a pair of substrates having surfaces facing each other, a plurality of electrodes formed on the surfaces of the pair of substrates, respectively, the display medium having a memory effect and formed between the pair of substrates, and the drive unit comprising the circuitry configured to apply the drive voltages to the display medium, the display medium includes a plurality of charged particles encapsulated therein such that movement of the charged particles based on the drive voltages applied by the circuitry of the drive unit provides display, and the charged particles comprise a plurality of first particles for displaying the first color with application of a first voltage, a plurality of second particles for displaying the second color with application of a second voltage having a polarity different from a polarity of the first voltage, and a plurality of third particles for displaying the third color with application of a third voltage which has the same polarity as the polarity of the first voltage and an absolute value smaller than an absolute value of the first voltage.

8. The method according to claim 7, wherein the second step includes restoring the third color via at least the first color or the second color.

9. The method according to claim 8, wherein the first step includes displaying the first color via at least the second color in a first color portion, displaying the second color via at least the first color in a second color portion, and displaying the third color via at least the first color or the second color in the third color portion.

10. The method according to claim 7, wherein the first step includes displaying the first color via at least the second color in a first color portion, displaying the second color via at least the first color in a second color portion, and displaying the third color via at least the first color or the second color in the third color portion.

11. The method according to claim 7, wherein the first image of the display medium is rewritten to the second image of the display medium such that color unevenness in the third color portion after the second step is smaller than color unevenness in the third color portion after the first step.

12. The method according to claim 7, wherein the second step is repeated a plurality of times.

13. The method according to claim 7, wherein the pair of substrates include a first substrate and a second substrate such that the electrodes comprise pixel electrodes formed on the first substrate, and a counter electrode formed on the second substrate, the applying of the drive voltages of the first and second steps includes applying 0 V to the counter electrode, and applying the first voltage, the second voltage, the third voltage or 0 V to the pixel electrodes, the first step includes a combination of a plurality of sub-steps of applying the first voltage, the second voltage, the third voltage or 0 V to the pixel electrodes, and the second step includes a combination of a plurality of sub-steps of applying the first voltage, the second voltage, the third voltage or 0 V to the pixel electrodes.

14. The method according to claim 13, wherein the drive voltages to the pixel electrodes are adjusted based on Vgf=ΔVg·Cgd/(Cs+Cp+Cgd) to V1+Vgf, V2+Vgf, V3+Vgf, and 0V+Vgf, where the first voltage is V1, the second voltage is V2, the third voltage is V3, Vgf is a gate-feedthrough voltage, ΔVg is a gate voltage variation, Cgd is a gate-drain capacitance, Cs is a storage capacitance connected to the pixel electrodes, and Cp is a capacitive component of the display medium.

15. The method according to claim 7, further comprising:
applying a predetermined voltage to a counter electrode; and
applying the first voltage, the second voltage, the third voltage or 0 V to a pixel electrode by applying a selective voltage to gate wires in a state where the first voltage, the second voltage, the third voltage or 0 V is applied to source wires,
wherein the pair of substrates include a first substrate and a second substrate such that the electrodes comprise pixel electrodes connected to an array of thin film transistors formed on the first substrate, and the counter electrode formed on the second substrate, the thin film transistors are arrayed near respective intersections of the gate wires and the source wires, the first step includes a combination of a plurality of sub-steps of applying the first voltage, the second voltage, the third voltage or 0 V to the pixel electrodes, and the second step includes a combination of a plurality of sub-steps of applying the first voltage, the second voltage, the third voltage or 0 V to the pixel electrodes.

16. The method according to claim 7, wherein the second step includes a sub-step of applying the first voltage, a sub-step of applying the third voltage or a sub-step of applying 0 V to a portion of the first color.

17. The method according to claim 7, wherein the second step includes a sub-step of applying the second voltage or a sub-step of applying 0 V to a portion of the second color.

18. The method according to claim 7, wherein the second step includes a sub-step of applying the first voltage, a sub-step of applying the second voltage, a sub-step of applying the third voltage or a sub-step of applying 0 V to the third color portions, has a sub-step of applying at least the second voltage to the third color portions, and ends with a sub-step of applying the third voltage to the third color portions, or ends with a sub-step of applying 0 V to the third color portions after a sub-step of applying the third voltage to the third color portions.

19. The method according to claim 7, wherein the second step includes simultaneously conducting a last part of the sub-steps of applying the third voltage to the third color portions, the sub-step of applying the first voltage to a portion of the first color, and the sub-step of applying the second voltage to a portion of the second color.

20. The method according to claim 7, wherein the first step includes simultaneously conducting a last part of the sub-steps of applying the third voltage to the third color portions, the sub-step of applying the first voltage to the first color portions, and the sub-step of applying the second voltage to the second color portions.

* * * * *